(12) United States Patent
Liu et al.

(10) Patent No.: US 7,643,424 B2
(45) Date of Patent: *Jan. 5, 2010

(54) ETHERNET ARCHITECTURE WITH DATA PACKET ENCAPSULATION

(75) Inventors: Kuo-Hui Liu, San Ramon, CA (US); Cheng-Hong Hu, San Ramon, CA (US); Chin Yuan, San Ramon, CA (US); Chou Lan Pok, San Ramon, CA (US)

(73) Assignee: AT&T Intellectual Property l, L.P., Reno, NV (US)

( * ) Notice: Subject to any disclaimer, the term of this patent is extended or adjusted under 35 U.S.C. 154(b) by 1143 days.

This patent is subject to a terminal disclaimer.

(21) Appl. No.: 10/394,482

(22) Filed: Mar. 22, 2003

(65) Prior Publication Data

US 2004/0184408 A1    Sep. 23, 2004

(51) Int. Cl.
   *H04J 3/14* (2006.01)
(52) U.S. Cl. .............. 370/236.2; 370/389; 370/392; 370/404; 370/469; 370/474
(58) Field of Classification Search .......... 370/389, 370/236, 392, 401–404, 466, 474, 469
   See application file for complete search history.

(56) References Cited

U.S. PATENT DOCUMENTS

| | | |
|---|---|---|
| 5,732,071 A | 3/1998 | Saito et al. |
| 5,757,924 A | 5/1998 | Friedman et al. |
| 5,790,541 A | 8/1998 | Patrick et al. |
| 5,912,891 A | 6/1999 | Kanai |
| 6,049,528 A | 4/2000 | Hendel et al. |
| 6,061,728 A | 5/2000 | Mead et al. |
| 6,188,689 B1 | 2/2001 | Katsube et al. |
| 6,343,330 B1 | 1/2002 | Khanna et al. |
| 6,512,744 B1 | 1/2003 | Hughes |
| 6,775,239 B1 | 8/2004 | Akita |
| 6,967,927 B1 | 11/2005 | Dugeon |
| 7,092,361 B2 | 8/2006 | Puppa |
| 7,097,008 B2 | 8/2006 | Pham |
| 7,155,215 B1 | 12/2006 | Miernik |
| 7,260,097 B2 | 8/2007 | Casey |

(Continued)

OTHER PUBLICATIONS

Sodder et al. Hierarchical LAN Services, Jan. 2003.*

(Continued)

*Primary Examiner*—Kevin C Harper
*Assistant Examiner*—Henry Baron
(74) *Attorney, Agent, or Firm*—Toler Law Group

(57) ABSTRACT

A method of encapsulating data packets for use in a distributed computer network is disclosed. The method includes providing a data packet for transmission over the distributed computer network, the data packet selected from one of a customer data packet and an OAM data packet; and encapsulating the data packet with a medium access control outer packet. The disclosed data packet handling method includes receiving a data packet from a customer facing data port, the customer facing data port within a network node of a computer network; performing medium access control (MAC) learning for the received packet; determining whether the data port is a MAC-in-MAC port; performing a packet mapping to a destination address based on a service provider destination address; and encapsulating the received data packet with a header associated with the service provider.

8 Claims, 4 Drawing Sheets

U.S. PATENT DOCUMENTS

| | | | |
|---|---|---|---|
| 7,283,465 | B2 | 10/2007 | Zelig |
| 2001/0009550 | A1 | 7/2001 | Mizuhara |
| 2002/0118644 | A1 | 8/2002 | Moir |
| 2002/0181457 | A1 | 12/2002 | Mezeul |
| 2003/0028890 | A1 | 2/2003 | Swart |
| 2003/0103522 | A1 | 6/2003 | Hane |
| 2003/0198182 | A1 | 10/2003 | Pegrum |
| 2003/0208525 | A1 | 11/2003 | Bannai |
| 2004/0037279 | A1 | 2/2004 | Zelig |
| 2004/0081203 | A1* | 4/2004 | Sodder et al. ............... 370/469 |
| 2005/0213594 | A1 | 9/2005 | Klink |
| 2006/0039374 | A1 | 2/2006 | Belz |

OTHER PUBLICATIONS

Virtual Hierarchical LAN Services PPVPN Working Group Arnold Sodder Internet Draft Tenor Networks Document: draft-sodder-ppvpn-vhls-00.txt.*
IEEE 802 LAN IEEE Standards for Local and Metropolitan Area Networks: Recommended Practice for Media Access Control (MAC) Bridging of Ethernet V2.0 in IEEE 802 Local Area Networks; IEEE Std 802.1 H-1995.*
Sodder et al. Hierarchical LAN Services, PPVPN Working Group, Internet Draft, draft-sodder-ppvpn-vhls-00.txt, Oct. 2002.*
IEEE 802 LAN IEEE Standards for Local and Metropolitan Area Networks: Recommended Practice for Media Access Control (MAC)Bridging of Ethernet V2.0 in IEEE 802 Local Area Networks; IEEE Std 802.1 H-1995; p. 10; figure 9, hereafter IEEE Std 802.1 H-1995.*
Virtual Private LAN Services Over MPLs, Mar. 2002.
A Layman's Overview of Ethernet and Ethernet/IP, Apr. 16, 2002.
Requirements for Virtual Private LAN Services (VPLS), Feb. 2002.
Hierarchical Virtual Private LAN Service, Nov. 2001.
Virtual Private LAN Services Using Logical PE Architecture, Nov. 2001.
Decoupled Virtual Private LAN Services, Nov. 2001.
Ethernet over MPLS on Cisco 7600 Series Router, Sep. 11, 2001.
An Introduction to MPLS, Sep. 10, 2001.
MPLS eSeminar, May 30, 2001.
LAN Switching, Apr. 26, 2001.
Multiprotocol Label Switching Architecture, Jan. 2001.
MPLS Enhancements to Support Layer 2 Transport Services, 2001.
Overview of Routing Between Virtual LANs.
Introduction to vLANs.

* cited by examiner

ETHERNET ARCHITECTURE WITH DATA PACKET ENCAPSULATION

BACKGROUND

This application relates to co-pending application Ser. No. 10/357,280 filed Feb. 3, 2003, entitled ENHANCED H-VPLS SERVICE ARCHITECTURE USING CONTROL WORD, by Chenghong Hu, et. al.

This application relates to co-pending application Ser. No. 10/394481 filed the same day as the present application, entitled OPERATIONS, ADMINISTRATION, AND MAINTENANCE DATA PACKET AND RELATED TESTING METHODS, by Chou Lan Pok, et al.

FIELD OF THE INVENTION

The present invention relates to systems and methods associated with data communications and data packet encapsulation, including various Ethernet services.

DESCRIPTION OF THE RELATED ART

Many systems and architectures have been disclosed for handling data traffic over distributed networks. One type of system that has been recently proposed to the Internet Engineering Task Force (IETF) is using the Ethernet over multi-protocol label switching (MPLS) architecture to implement a virtual private LAN service (VPLS).

While the proposed system has many benefits in providing cost effective data services, this system fails to adequately take into consideration scalability issues, such as medium access control (MAC) address computational concerns for networks with large numbers of customer MAC addresses, and maintenance issues, such as providing edge-to-edge troubleshooting.

Accordingly, there is a need for improved systems and methods of providing data communications.

SUMMARY

The present disclosure is generally directed to systems and methods associated with data communications. In a particular embodiment, a method of encapsulating data packets for use in a distributed computer network is disclosed. The method includes providing a data packet for transmission over the distributed computer network, the data packet selected from one of a customer data packet and an OAM data packet; and encapsulating the data packet with an additional provider MAC header (outer header). This is referred as MAC-in-MAC mechanism in this document.

In another embodiment, a data packet handling method is disclosed. The data packet handling method includes receiving a data packet from a customer facing data port within a network node of a computer network; performing MAC address learning for the received packet; determining whether the data port is a MAC-in-MAC port; performing a packet mapping to a destination MAC address based on a service provider destination MAC address; and encapsulating the received data packet with a header associated with the service provider.

In another embodiment, a medium access control (MAC) encapsulated data packet for distribution over an Ethernet network is disclosed. The MAC encapsulated data packet includes a provider destination MAC address field; a provider source MAC address field; an Ethertype field; and followed by a customer data packet. In other words, the customer data packet encapsulates a provider header that includes the provider destination MAC address field, the provider source MAC address field, and the Ethertype field.

In another embodiment, an encapsulation method for use in a provider network is disclosed. The method includes performing a first type of medium access control (MAC) packet encapsulation in a bridged mode at a first node within the provider network; and performing a second type of medium access control (MAC) packet encapsulation in a routed mode at a second node within the provider network.

In another embodiment, a method of processing a data packet communicated within a provider network is disclosed. The method includes receiving an encapsulated data packet at an egress point of a multi tenant unit of the provider network and stripping off a provider header from the encapsulated data packet to produce a data packet selected from one of a customer packet and an OAM packet.

In another embodiment, a method of processing a data packet communicated within a provider network is disclosed. The method includes receiving an encapsulated data packet at an egress point of a multi tenant unit of the provider network; stripping off an outer medium access control (MAC) header for an OAM packet in a routed mode; and performing processing on the recovered OAM packet.

BRIEF DESCRIPTION OF THE DRAWINGS

The use of the same reference symbols in different drawings indicates similar or identical items.

DESCRIPTION OF THE DRAWING(S)

Figure 1:
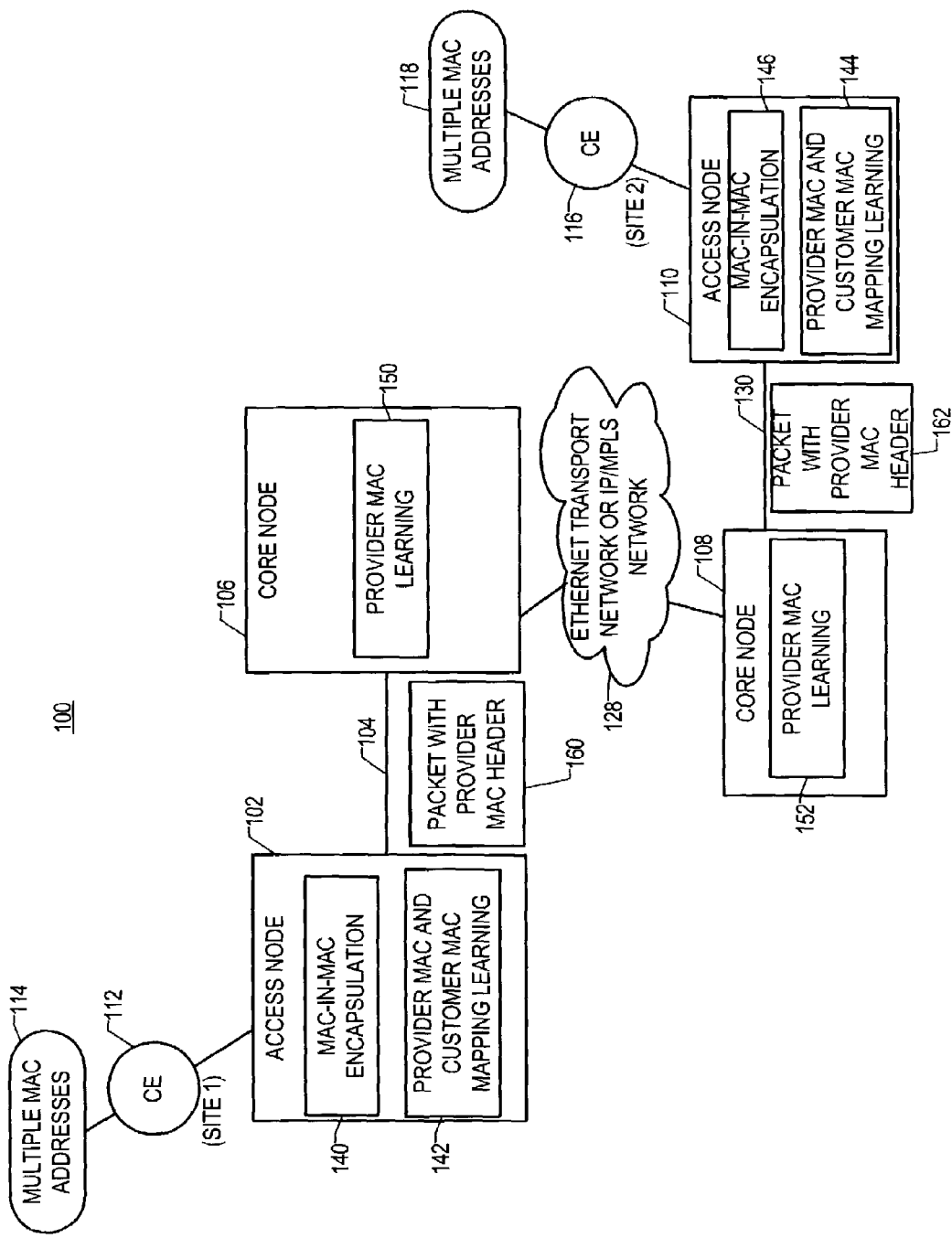
FIG. 1 is a block diagram that illustrates a general system architecture that provides Ethernet service with MAC-in-MAC encapsulation.

Referring to FIG. 1, a system 100 is disclosed. The system 100 includes customer equipment at a first site 112 and at a second site 116. The system 100 also includes Access Nodes 102 and 110 and Core Nodes 106 and 108. The Nodes can be either Ethernet switches or IP/MPLS capable Ethernet routers. The system 100 includes an Ethernet or Ethernet transport network 128 between the Core Nodes 106 and 108. This network can also be an IP/MPLS network. The Access Node 102 is linked to the Core Node 106 via circuit 104 and the second Core Node 108 is linked to the second Access Node 110 via circuit 130. Both circuits 104 and 130 could be either traditional Ethernet links or Ethernet over MPLS (EoMPLS) links. The customer equipment 112 at the first site is associated with a plurality of MAC addresses 114 and the customer equipment at the second site 116 is associated with a second plurality of MAC addresses 118. The Access Node 102 includes a MAC-in-MAC encapsulation module 140 and provider MAC and customer MAC mapping learning 142. The Access Node 102, upon receiving data packets, encapsulates a provider MAC address. The MAC-in-MAC address header is then communicated via circuit 104 in association with a communicated data packet 160 to the Core Node 106.

The Core Node 106 includes provider MAC learning module 150 for receiving and processing data packet 160. Similarly, Core Node 108 includes provider MAC learning module 152. Communication of the MAC header 162 is made over a circuit 130 to the Access Node 110. The Access Node 110 includes provider MAC and customer MAC mapping learning module 144 and MAC-in-MAC encapsulation 146. During operation, data from customer equipment associated with a particular MAC address within the plurality of MAC addresses 114 is communicated via CE 112 at the first site to Access Node 102. The Access Node 102 converts the MAC address within the set of MAC addresses to a particular provider MAC header in connection with the data packet communicated to the switch 106. The Core Node 106 performs provider MAC learning, communicates a data packet over the Ethernet network 128 and the data packet is received at Core Node 108. The Core Node 108 forwards the data packet and the MAC header 162 to destination access switch 110, which forwards the packet to the customer equipment 116 at the second site, and finally to the customer equipment at the destination MAC address. The destination MAC address is within the second set of MAC addresses 118.

Figure 2:
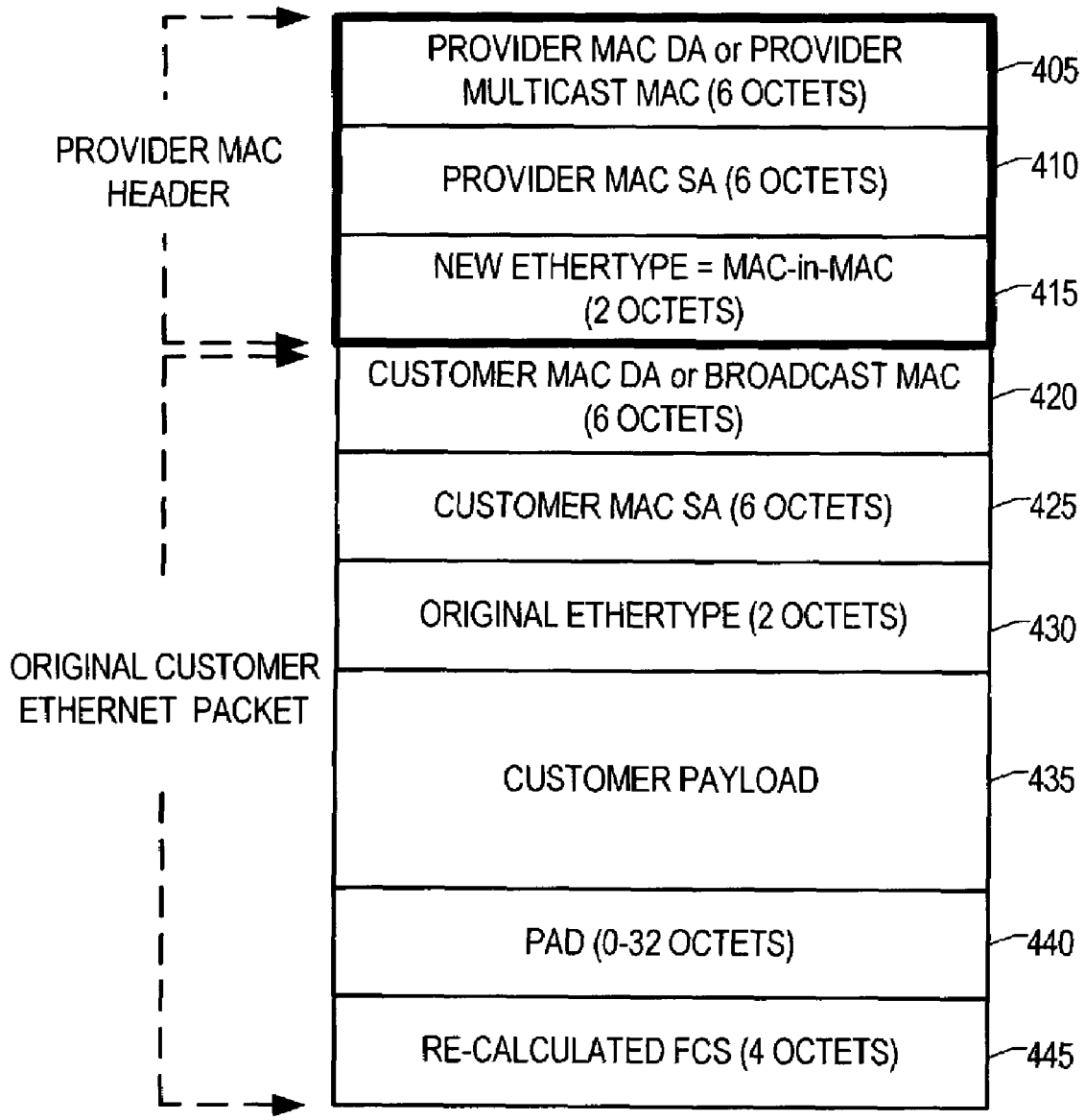
FIG. 2 illustrates an example of a MAC-in-MAC customer data packet.

FIG. 2 illustrates an example of a customer packet with MAC-in-MAC encapsulation. For purposes of illustration, in the present example, while specific lengths and number of fields are described, one skilled in art will appreciate that any number of fields with any lengths (e.g. jumbo frames or the like) can be used as defined and supported by the protocols employed in the networks. The number and description of fields in the header can be configured in any order or combination thereof according to the specific network requirements.

Fields 405 and 410 are each six octets wide, which are populated with provider MAC destination address (DA) and provider MAC source address (SA), respectively. The field 415 defines the new Ethertype as a MAC-in-MAC packet. For customers that interface with bridging devices, the MAC DA 420 and MAC SA 425 fields are populated with the customer MAC addresses. For customers that interface with routing devices, the MAC DA and MAC SA fields are encapsulated with the customer router MAC addresses. Fields 420 and 425 are both 6 octets wide. Field 430 is two octets wide and defines the Ethertype field original data packet. Field 435 is the customer payload portion of the MAC-in-MAC packet and has a variable length. Field 440 is the padding area and field 445 is a four octets wide frame check sequence (FCS).

Field 415 is 2 octets wide and defines "Ethertype" to identify MAC-in-MAC Ethernet encapsulation. The value of this field can be assigned according to standards employed by the network. Field 420 is 6 octets wide and defines the original MAC DA. Field 425 is 6 octets wide and defines the original MAC SA. Field 430 is 2 octets wide and defines "Ethertype" for the original packet. Field 435 is a combination of various fields defined in a conventional MAC frame. Field 440 can be a variable size pad inserted to comply with employed protocols. Field 445 is four octets wide and defines frame check sequence (FCS) for the MAC-in-MAC Ethernet frame. The Frame Check Sequence (FCS) is re-calculated to include newly defined fields.

A provider MAC address is assigned to a customer facing port at a access node that belongs to a customer VPLS based on VLAN information. A port can have many provider MAC addresses based on the number of VLANs supported. With MAC-in-MAC encapsulation enabled, packet forwarding within the network nodes is based on the provider's MAC addresses. A mapping between the original customer SA and its corresponding provider SA is learned at ingress as well as the egress of the provider's network. This mapping information is used for MAC-in-MAC encapsulation when the customer packet enters the provider's network.

Packets for a VPLS service inside a service provider's network may be forwarded using provider MAC addresses. When a VPLS is router-based (i.e., all network elements in the VLAN are routers), packets are forwarded using router MAC addresses.

Figure 3:
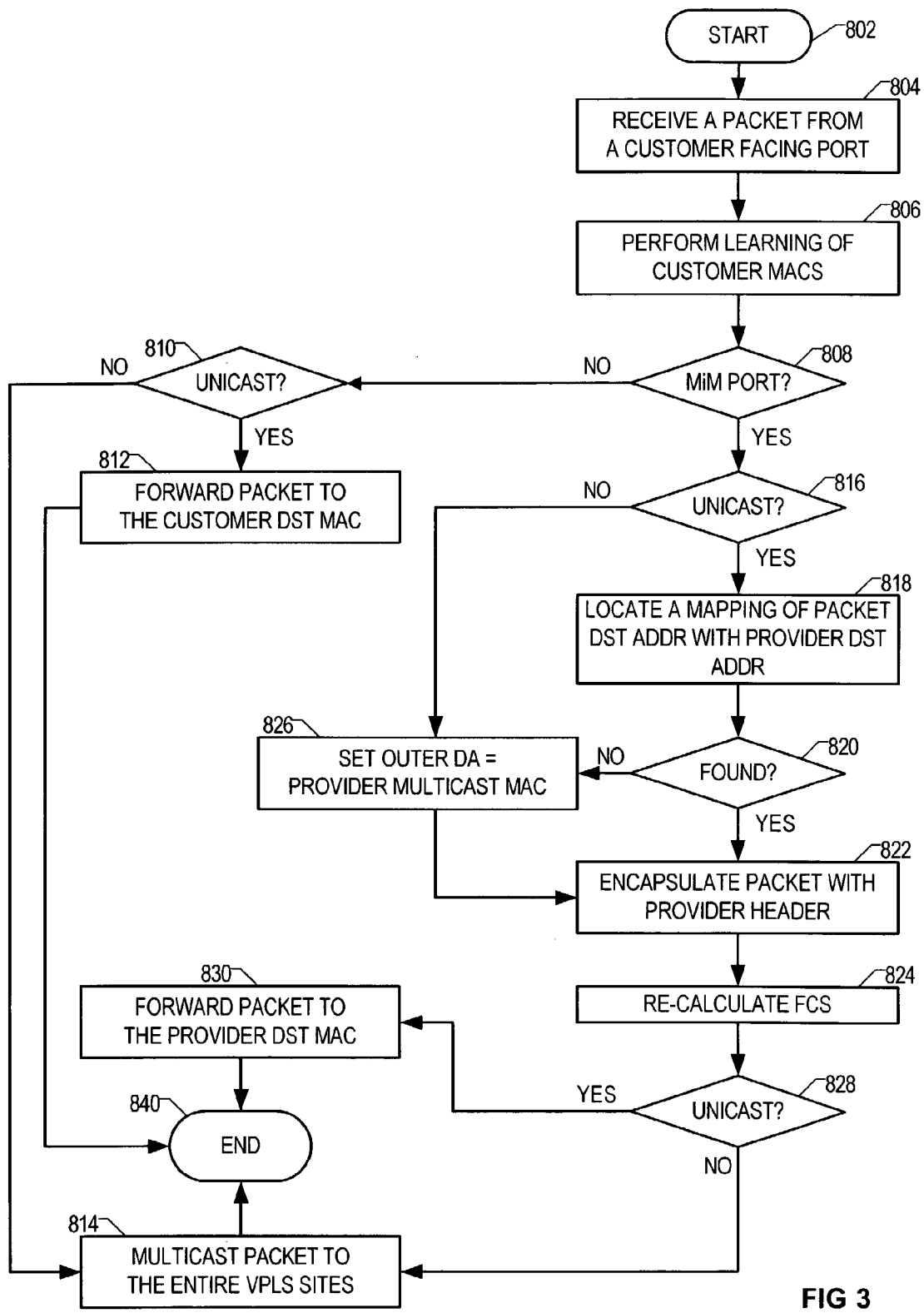
FIG. 3 is a flow diagram illustrating a method for handling customer packets at an ingress point for MAC-in-MAC mode.

Referring to FIG. 3, a method for handling customer packets at an ingress point for MAC-in-MAC mode is disclosed. A packet is received from a customer facing port, at 804 and learning for the customer MAC addresses is performed, at 806. A determination is made, at decision block 808, of whether a port is a MAC-in-MAC (MiM) port. If a MiM port is detected, then processing continues at decision block 816. A determination is made at decision step 816 whether the packet is a unicast packet. If the packet is a unicast packet, then a mapping of the packet is located with respect to a destination address with the provider destination address, at 818. If the mapping is found at decision step 820, then the packet is encapsulated with a provider header, at 822, and the frame check sequence (FCS) is recalculated, at 824. If the packet address is not found, at decision 820, then the outer destination address is set equal to the provider multicast MAC, at step 826, and processing continues with packet encapsulation, at 822. After recalculating the FCS, at 824, another determination of whether a unicast packet is made at decision step 828. If a unicast mode is detected, then the packet is forwarded according to the provider destination MAC, at 830, and processing is completed at 840. In the case where a unicast packet is not detected, then a multicast packet is broadcast to each of the VPLS sites, at 814.

Referring again to decision block 808, where a MiM port is not detected, then a determination for unicast is made, at decision step 810. If unicast mode is detected, then the packet is forwarded according to the customer destination MAC at step 812, and processing is completed at 840. If unicast is not detected, at decision step 810, then a multicast mode is pursued and the packet is multicast to each of the VPLS sites, at 814, and processing is completed at 840.

Figure 4:
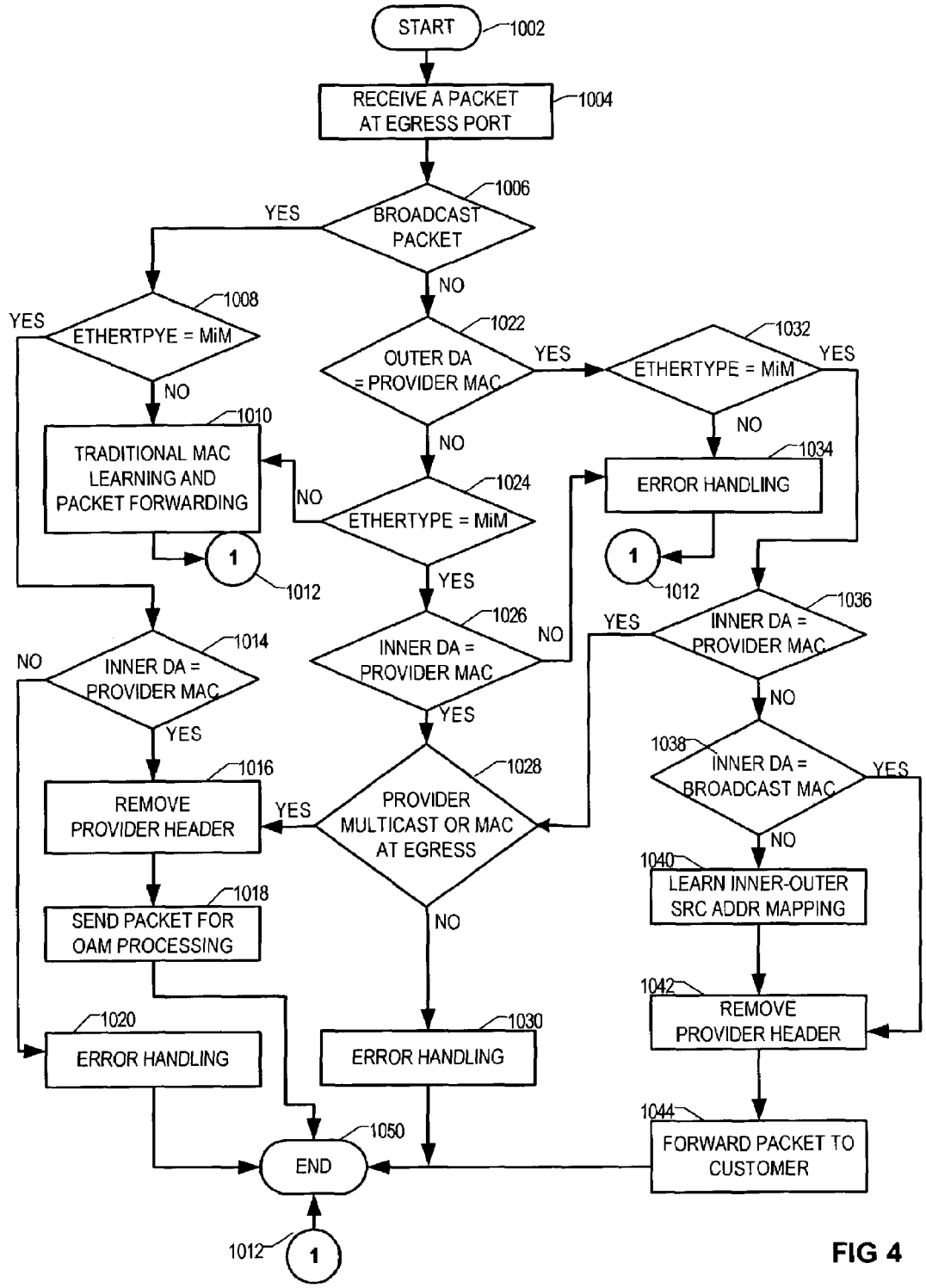
FIG. 4 is a flow diagram illustrating a method of packet handling at an egress point for MAC-in-MAC mode.

Referring to FIG. 4, a method of packet handling at an egress point for MAC-in-MAC mode is disclosed. A packet to be analyzed is received at an egress port at 1004. At decision step 1006, a determination is made whether the packet is for broadcast. If a broadcast packet is detected, then decision step 1008 is evaluated to determine whether the Ethertype is equal to MiM. If the Ethertype is not determined to be set equal to MiM, then traditional MAC learning and packet forwarding is executed, at 1010, and processing then continues to logic flow marker 1, at 1012, and to the end of processing, at 1050.

Referring back to decision step 1008, if the Ethertype is equal to MiM, then a determination is made whether the inner destination address is equal to the provider MAC, at decision step 1014. Where this determination is positive then the provider header is removed, at 1016, the packet for OAM processing is sent, at 1018, and processing ends at step 1050. In the case where the inner destination address is not equal to the provider MAC, then an error handling routine is performed at 1020 and processing ends at 1050.

Referring again to decision step 1006, if the broadcast packet determination is negative, then at decision step 1022, the outer destination address is compared to the provider MAC. If the outer destination address equals the provider MAC, then a determination is made regarding the Ethertype, at decision step 1032. If the Ethertype is not equal to the MiM at 1032, then an error is detected and error handling is performed at 1034, leading to the end of processing at 1012, 1050. Where the Ethertype is equal to MiM, at 1032, then the inner destination address is compared to the provider MAC, at decision step 1036. Where the inner destination address is not equal to the provider MAC, then the inner destination address is compared to the broadcast MAC, at decision step 1038. Where this decision is negative, processing continues at 1040, where the inner and outer source address mapping is learned and where the provider header is removed, at 1042. Where the inner destination address is equal to the broadcast MAC, at decision step 1038, then processing is continued where the provider header is removed, at 1042. In either situation, the packet is forwarded to the customer, at 1044 and processing is completed at 1050.

Referring again to decision step 1022, where the outer destination address is not equal to the provider MAC, then a determination is made, at decision step 1024, whether the Ethertype is equal to MiM. Where the Ethertype is not equal to MiM, then processing continues from decision step 1024 to processing step 1010 as described above. Where the Ethertype is equal to MiM, then a determination is made at decision step 1026, whether the inner destination address equals the provider MAC. Where the inner destination address does not equal the provider MAC, then an error is detected and error handling is performed at 1032 and processing is completed at 1012, 1050. Where the inner destination address does equal the provider MAC, then a determination is made, at decision step 1028, regarding multicast. Where a provider multicast or MAC at egress situation is detected at 1028, then processing at this point continues to step 1016 as described above. In the case where the provider multicast or MAC at egress at 1028 determination is negative, then an error is detected and error handling is performed at 1030 eventually leading to completion of processing at 1050.

The MAC-in-MAC encapsulation technique may be used to avoid massive customer MAC address handling on provider Core devices. A new provider MAC address is provided to represent one or many customer MAC addresses behind a customer facing port. Core devices perform a limited amount of network address learning. The MAC-in-MAC encapsulation also provides for OAM delivery (e.g., to facilitate point-to-point, point-to-multi-point reachability testing, performance measurement, or the like). Customer MAC addresses learning at gateway devices may be beneficially reduced or eliminated when a VPLS service spans multiple domains. The discloses MAC-in-MAC packet encapsulation mechanism is applicable to any Ethernet services, including pure Ethernet, Ethernet over MPLS, VPLS, Ethernet over ATM, Ethernet over frame relay, etc.

The above disclosed subject matter is to be considered illustrative and the appended claims are intended to cover all such modifications and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An encapsulation method for use in a provider network comprising:
    performing a first type of medium access control (MAC) packet encapsulation in a bridged mode at a first node within the provider network; and
    performing a second type of medium access control (MAC) packet encapsulation in a routed mode at a second node within the provider network;
    processing the encapsulated packet such that an inner destination address is compared to a provider MAC address of a node for forwarding based on the said inner destination address of the encapsulated data packet; and
    subsequently stripping a header from the encapsulated data packet after the processing.

2. The method of claim 1, wherein in the bridged mode, the first type of packet encapsulation uses a provider header for both customer packets and OAM packets, and wherein in the routed mode, the second type of packet encapsulation applies to OAM packets but not to customer packets.

3. The method of claim 2, wherein the OAM packets follow the same path through the provider network as for customer packets.

4. The method of claim 1, wherein the first node is an ingress point of an access node and wherein the first type of packet encapsulation uses a provider MAC header.

5. The method of claim 1, wherein the second node is an ingress point of an access node and wherein the second type of packet encapsulation uses a customer router MAC header for encapsulation of an OAM packet.

6. A method of processing a data packet communicated within a provider network, the method comprising:
    receiving an encapsulated data packet at an egress point of an access node of the provider network;
    determining whether the encapsulated data packet is for broadcast;
    determining whether an inner destination address of the encapsulated data packet is equal to a provider MAC for use in forwarding based on the said inner destination address of the encapsulated data packet; and
    stripping off a provider header from the encapsulated data packet to produce a data packet selected from one of a customer packet and an OAM packet, wherein the stripping takes place after determining whether the inner destination address is equal to the provider MAC.

7. The method of claim 6, wherein the data packet is a customer packet and further comprising forwarding the customer packet to customer equipment coupled to the provider network.

8. A method of processing a data packet communicated within a provider network, the method comprising:
    receiving an encapsulated data packet at an egress point of an access node of the provider network;
    determining whether the encapsulated data packet is for broadcast;
    determining whether an inner destination address of the encapsulated data packet is equal to a provider MAC for use in forwarding based on the said inner destination address of the encapsulated data packet;
    stripping off an outer medium access control (MAC) header for an OAM packet in a routed mode, wherein the stripping takes place after determining whether the inner destination address is equal to the provider MAC; and
    performing processing on the recovered OAM packet.

* * * * *